United States Patent Office 3,102,548
Patented Sept. 3, 1963

3,102,548
PROCESS FOR ENHANCING THE FLOW
OF FLUIDS
James B. Smith, Princeton, N.J., and Francis S. Seichter, Stamford, and Stephen F. Adler, South Norwalk, Conn., assignors to American Cyanamid Company, Stamford, Conn., a corporation of Maine
No Drawing. Filed Aug. 14, 1962, Ser. No. 216,762
6 Claims. (Cl. 137—13)

The present invention relates to a process for enhancing the flow of fluids. More particularly, the invention relates to a method for decreasing friction loss in the flow of fluids. Still more particularly, the invention is concerned with the addition of a high molecular weight polyacrylamide containing little or no residual carboxyl groups to an aqueous fluid so as to reduce its friction loss due to flow through a conduit.

The problem of reducing pumping costs in moving large volumes of fluids is ever present. For instance, many chemical plants require the movement of substantial volumes of fluids. Additionally, in diverse operations, such as hydraulic fracturing of gas or oil well sites, large volumes of aqueous fluids are demanded. To effect necessary economies in pumping costs, polymeric additives to fluids designed for decreasing friction loss in flowing fluids have been suggested. One such additive is the class of guar gums. However, these gums are not entirely satisfactory because they remain substantially inactive in the fluid for about one day prior to use. Further, their high cost/low performance ratio mitigates against their extended commercialization. Another suggested additive is the class of hydrolyzed polymeric acrylamides containing a relatively high mol percent of carboxyl groups. Their use had been thought to solve adequately the problem of reducing pumping costs. Although these polymers perform relatively satisfactorily when added to water as such, they are not entirely satisfactory in all aqueous environments. More particularly, the aforementioned class of hydrolyzed polyacrylamides is unsatisfactory in a contaminated aqueous fluid such as, for instance, salt water or hard water having a high calcium ion content of four hundred parts per million or more. If a relatively low cost additive could be provided which performs satisfactorily in all aqueous environments, such an additive would be highly desirable as fulfilling a long-felt need.

It is, therefore, a principal object of the present invention to provide a polymeric acrylamide additive, hereinbelow defined, which when added to an aqueous fluid, reduces friction loss inherent in a flowing fluid. A further object is to provide a process for pumping aqueous fluids, whether contaminated or not, wherein the pressure drop due to fluid flow is substantially decreased. These and other objects of the invention will become apparent from a consideration of the following detailed description.

To this end, polyacrylamides of well defined molecular weight ranges and containing little or no residual carboxyl groups can be added in small quantities to a pumpable aqueous fluid to affect its flow performance. Unexpectedly it is found that, due to the addition of such polymers into the pumpable medium, the pressure drop caused by friction loss in fluid flow is markedly decreased regardless of contamination of the medium. Thus, in the process of the present invention, polyacrylamide having an average molecular weight between about three millions and twelve millions, and preferably between three and three-quarter millions and seven and one-half millions, and containing from zero to about three mol percent residual carboxyl groups, is advantageously added to a pumpable fluid in concentrations from about 0.0075 to about 0.03 weight percent, and preferably from 0.01 to 0.025 weight percent.

In general, the polyacrylamide employed in the instant invention is prepared by employing free-radical polymerization techniques.

A typical synthesis involves the addition of 35 parts by weight of acrylamide per 365 parts by weight of completely deaerated and nitrogen-purged water in a suitable reaction vessel. The latter vessel and contents are placed in an inert nitrogen atmosphere. With rapid stirring, 0.035 part of sodium bromate, 0.0035 part of sodium persulfate and 0.00035 part of sodium bisulfite are added in the order mentioned. The reaction temperature increases from about 25° C. to 34° C. and is held at the latter temperature for approximately from two to two and one-half hours. Thereafter, the temperature is permitted to rise to 65° C. and is held at the latter temperature for an additional ten hours. Polymeric acrylamide containing less than about one percent residual carboxyl groups and having an average molecular weight of about 3.75 millions is obtained.

By judicious variations of proportions of polymerization catalysts and time of reaction, modifications of the polyacrylamide in the average molecular weight and residual carboxyl content can be realized. Thus, for instance, as in the above synthesis, decrease of the catalyst and initiation temperature and increased time of over-all reaction increase the molecular weight and residual carboxyl content of the polymeric acrylamide.

Polyacrylamide additive is effective in reducing the friction losses of fluids under turbulent flow at substantially steady state conditions. For purposes of further illustrating the invention, water containing the additive is pumped through piping of various diameter sizes. The pressure drop is then compared to the pressure drop measured when water alone is pumped through suitable apparatus at the same flow rate without the addition of the polymeric additive.

Suitable apparatus employed herein comprises a thirty-five gallon tank in which the test solution is stirred. The solution is pumped by means of a centrifugal pump through a test section of linear pipe and is then returned to the storage tank. The pressure drop is readily determined by measuring the pressure at the entrance and the discharge ends of the test section of pipe by means of test gauges.

Test pipes which have an internal diameter of 1.71 centimeters and 0.84 centimeter, respectively, are advantageously employed in the test sections. Each test section is 8.3 feet in length.

The symbol V as employed in the tables below is defined as the linear velocity of the fluids in centimeters per second.

The symbol $\Delta P_0$ designates the change in pressure (pounds per square inch gauge) in the test section when no additive is employed.

The symbol $\Delta P_p$ equals the change in pressure (pounds per square inch gauge) in the test section when the polymeric additive of the invention is used.

The term percent reduction is defined as:

$$\frac{(\Delta P_0 - \Delta P_p) \times 100}{\Delta P_0}$$

Results of the tests are tabularized below.

Table I

TEST PIPE EQUAL TO 1.7 CENTIMETERS INTERNAL DIAMETER

| Uncontaminated deionized water | | Polyacrylamide[1] in deionized water | | |
|---|---|---|---|---|
| | | Concentration of polymer: 0.025% | | |
| V | $\Delta P_0$ | V | $\Delta P_p$ | Percent reduction |
| 400 | 3.45 | 400 | 1.45 | 58 |
| 500 | 5.0 | 500 | 2.1 | 58 |
| 590 | 6.8 | 590 | 2.9 | 57 |

TEST PIPE EQUAL TO 0.84 CENTIMETER INTERNAL DIAMETER

| | | Concentration of polymer: 0.01% | | |
|---|---|---|---|---|
| 400 | 10.3 | 400 | 6.5 | 37 |
| 500 | 15.2 | 500 | 8.3 | 45 |
| 590 | 20.2 | 590 | 10.1 | 50 |
| 760 | 32.0 | 760 | 14.3 | 55 |
| | | Concentration of polymer: 0.025% | | |
| 400 | 10.3 | 400 | 5.7 | 45 |
| 500 | 15.2 | 500 | 7.2 | 53 |
| 590 | 20.2 | 590 | 8.5 | 58 |
| 760 | 32.0 | 760 | 10.9 | 65 |

[1] Contains no residual carboxyl groups and having an average molecular weight equal to $3.75 \times 10^6$.

From the above tabularized results, it will be seen that polyacrylamide of average molecular weight equal to at least 3.75 millions and containing no residual carboxyl groups enhances the flow of fluids by satisfactorily reducing the pressure drop of the fluid in linear conduits.

To show how contamination due to the presence of salt and the like affects friction loss, polyacrylamides of varying average molecular weight and residual carboxyl content are employed. From a consideration of Table II below, it will become apparent that the pressure loss values due to salt contaminated fluid are as good as or better than the pressure loss values due to the uncontaminated fluid. With respect to calcium ion contamination, the pressure loss performance is either unchanged or reduced to an insignificant extent, due to the addition of the polymers of the present invention.

In Table II below, the bulk velocity of the tested fluid is maintained at 20 kilograms per minute in test pipe equal to 0.84 centimeter internal diameter.

Table II

| Polyacrylamide additive at 0.175% concentration | Percent reduction (in $H_2O$) | Percent reduction (5% NaCl in $H_2O$) | Percent reduction (5% NaCl and 2% $Ca^{++}$ in $H_2O$) |
|---|---|---|---|
| 0% Carboxyl, M.W.=$3.5 \times 10^6$ | 59 | 59 | 59 |
| 0% Carboxyl, M.W.=$5.5 \times 10^6$ | 68 | 76 | 66 |
| 1% Carboxyl, M.W.=$3.5 \times 10^6$ | 61 | 62 | 60 |
| 1% Carboxyl, M.W.=$6.0 \times 10^6$ | 75 | 74 | 70 |
| 2% Carboxyl, M.W.=$3.0 \times 10^6$ | 51 | 53 | 51 |
| 2% Carboxyl, M.W.=$6.25 \times 10^6$ | 73 | 73 | 68 |
| 3% Carboxyl, M.W.=$5.75 \times 10^6$ | 71 | 70 | 63 |
| 3% Carboxyl, M.W.=$6.5 \times 10^6$ | 74 | 74 | 69 |

To demonstrate the effect of modifying the molecular weight of the polymeric additive at a concentration of 0.025%, based on the weight of the aqueous fluid, which is pumped through an 8.3 foot pipe having a 0.84 centimeter internal diameter, a number of test solutions is prepared in which polyacrylamides of average molecular weight range from $5 \times 10^5$ to $20 \times 10^6$ are separately incorporated.

Table III

| Polyacrylamide containing 0% COOH in $H_2O$ at 0.025% concentration, average molecular weight in millions | Percent reduction, 20 kb./min. |
|---|---|
| 0.5 | 0 |
| 0.75 | 5 |
| 1 | 14 |
| 2 | 26 |
| 2.5 | 30 |
| 3 | 50 |
| 3.5 | 59 |
| 4.5 | 65 |
| 5.5 | 68 |
| 6.25 | 73 |
| 8.5 | 60 |
| 9.25 | 54 |
| 12 | 48 |
| 14 | 41 |
| 20 | 35 |

It will be noted from a consideration of the data presented in the table above, that the reduction of the drop in pressure in water at a bulk velocity equal to twenty kilogram per minute utilizing a polyacrylamide additive of molecular weight of $5 \times 10^5$ is zero percent, whereas at an average molecular weight of $20 \times 10^6$ the percent reduction begins to fall rapidly subsequent to the attainment of a maximum of about 73% reduction utilizing a fluid containing polyacrylamide having an average molecular weight of $6.25 \times 10^6$. Thus, the table illustrates the criticality of the use of a polyacrylamide having a well-defined molecular weight range.

Although the process of the invention has been exemplified by sodium chloride and calcium ion contaminants, it is to be understood that equivalents thereof, such as for instance potassium chloride, lithium chloride, barium chloride, strontium chloride, nickel sulfate, cobalt chloride or iron nitrate, can be tolerated in the fluid.

We claim:

1. In a process wherein an aqueous fluid is pumped in turbulent flow under substantially steady state conditions, the improvement which comprises: admixing with the aqueous fluid from 0.0075 to 0.03 weight percent of a polyacrylamide containing from 0 to about 3 mol percent residual carboxyl groups and possessing an average molecular weight equal to at least 3 millions and not more than about 12 millions.

2. A process according to claim 1, wherein the polyacrylamide polymer contains less than about 1 mol percent residual carboxyl groups and possesses an average molecular weight of about 3.75 millions.

3. A process for reducing the friction loss in the flow of an aqueous fluid in turbulent flow under substantially steady state conditions which comprises: adding to the aqueous fluid from 0.0075 to 0.03 weight percent of a polyacrylamide having between 0 and about 3 mol percent residual carboxyl groups and possessing from 3 millions to 12 millions average molecular weight, and pumping the resultant mixture through a conduit whereby friction loss is markedly reduced.

4. A process according to claim 3, wherein the fluid is water contaminated with salt.

5. A process according to claim 3, wherein the fluid is water contaminated with salt and calcium ion mixture.

6. A process according to claim 3, wherein the polyacrylamide contains less than about 1 mol percent residual carboxyl groups and possesses an average molecular weight equal to 3.75 millions.

No references cited.